(12) United States Patent
Park (10) Patent No.: US 11,782,719 B2
(45) Date of Patent: Oct. 10, 2023

(54) RECONFIGURABLE MULTI-THREAD PROCESSOR FOR SIMULTANEOUS OPERATIONS ON SPLIT INSTRUCTIONS AND OPERANDS

(71) Applicant: Redpine Signals, Inc., San Jose, CA (US)

(72) Inventor: Heonchul Park, Pleasanton, CA (US)

(73) Assignee: Ceremorphic, Inc., San Jose, CA (US)

( * ) Notice: Subject to any disclaimer, the term of this patent is extended or adjusted under 35 U.S.C. 154(b) by 60 days.

(21) Appl. No.: 17/214,804

(22) Filed: Mar. 27, 2021

(65) Prior Publication Data

US 2022/0308889 A1  Sep. 29, 2022

(51) Int. Cl.
*G06F 9/38* (2018.01)
*G06F 9/30* (2018.01)

(52) U.S. Cl.
CPC .......... *G06F 9/3851* (2013.01); *G06F 9/3009* (2013.01); *G06F 9/3818* (2013.01); *G06F 9/3889* (2013.01)

(58) Field of Classification Search
CPC .. G06F 9/3851; G06F 9/30181; G06F 9/3818; G06F 9/30112; G06F 9/3009; G06F 9/3889; G06F 7/501; G06F 7/575
See application file for complete search history.

(56) References Cited

U.S. PATENT DOCUMENTS

| | | |
|---|---|---|
| 7,761,688 B1 | 7/2010 | Park |
| 2005/0177703 A1 | 8/2005 | Norden et al. |
| 2006/0184946 A1 | 8/2006 | Bishop et al. |
| 2007/0204137 A1* | 8/2007 | Tran ..................... G06F 9/3861 712/E9.035 |
| 2011/0099355 A1 | 4/2011 | Tran |
| 2017/0132049 A1 | 5/2017 | Mackerras |

OTHER PUBLICATIONS

Robert S. Chappell, Jared Stark, Sangwook P. Kim, Steven K. Reinhardt and Yale Patt, "Simultaneous Subordinate Microthreading (SSMT)", Aug. 6, IEEE, pp. 1-10 (Year: 2002).*
Collange, "Simty: a synthesizable general-purpose SIMT processor". Diss Inria Rennes Bretagne Atlantique, 2016 Aug. 2016.

* cited by examiner

*Primary Examiner* — Courtney P Carmichael-Moody
(74) *Attorney, Agent, or Firm* — File-EE-Patents.com; Jay A. Chesavage (57) ABSTRACT

A superscalar processor has a thread mode of operation for supporting multiple instruction execution threads which are full data path wide instructions, and a micro-thread mode of operation where each thread supports two micro-threads which independently execute instructions. An executed instruction sets a micro-thread mode and an executed instruction sets the thread mode.

18 Claims, 7 Drawing Sheets

Figure 1

*Figure 2B*
single 32b register file mode

Figure 3B
Reconfigurable 32b and dual 16b adder in dual 16b microthread mode

*Figure 4A*

| Fetch | Decode | EX1 |
|---|---|---|
| T0: ADD R1,R2,R3 | | |
| T1: ADD R4,R5,R6 | T0: ADD R1,R2,R3 | |
| T0: MT_MODE | T1: ADD R4,R5,R6 | T0: ADD R1,R2,R3 |
| T1: SUB R6,R1,R2 | T0: MT_MODE | T1: ADD R4,R5,R6 |
| T0_mt0: ADD R1,R2,R3<br>T0_mt1: ADD R2,R3,R4 | T1: SUB R6,R1,R2 | T0: MT_MODE |
| T1: SHFT R2,#4 | T0_mt0: ADD R1,R2,R3<br>T0_mt1: ADD R2,R3,R4 | T1: SUB R6,R1,R2 |
| T0_mt0: OR R3,#3,R3<br>T0_mt1: ADD R4,R5,R6 | T1: SHFT R2,#4 | T0_mt0: ADD R1,R2,R3<br>T0_mt1: ADD R2,R3,R4 |
| | T0_mt0: OR R3,#3,R3<br>T0_mt1: ADD R4,R5,R6 | T1: SHFT R2,#4 |
| | | T0_mt0: OR R3,#3,R3<br>T0_mt1: ADD R4,R5,R6 |
| | | |
| | | |

Figure 4B

| EX2/Load Store | Write Back |
|---|---|
| T0: ADD R1,R2,R3 | |
| T1: ADD R4,R5,R6 | T0: ADD R1,R2,R3 |
| T0: MT_MODE | T1: ADD R4,R5,R6 |
| T1: SUB R6,R1,R2 | T0: MT_MODE |
| T0_mt0: ADD R1,R2,R3<br>T0_mt1: ADD R2,R3,R4 | T1: SUB R6,R1,R2 |
| T1: SHFT R2,#4 | T0_mt0: ADD R1,R2,R3<br>T0_mt1: ADD R2,R3,R4 |
| T0_mt0: OR R3,#3,R3<br>T0_mt1: ADD R4,R5,R6 | T1: SHFT R2,#4 |
| | T0_mt0: OR R3,#3,R3<br>T0_mt1: ADD R4,R5,R6 |

RECONFIGURABLE MULTI-THREAD PROCESSOR FOR SIMULTANEOUS OPERATIONS ON SPLIT INSTRUCTIONS AND OPERANDS

FIELD OF THE INVENTION

The present invention relates to an architecture for a pipelined single instruction multiple data (SIMD) or multiple instruction multiple data (MIMD) architecture microprocessor. In particular, the invention relates to an architecture for executing multiple instructions on separate threads simultaneously.

BACKGROUND OF THE INVENTION

Prior art microprocessors provide increasing computing power through wider data busses for increasing data throughput. In modern machine learning applications, and specifically neural network data processing, it has been determined that performing large numbers operations simultaneously on smaller data widths provides satisfactory results compared to performing those operations on higher resolution data, thereby reducing energy and computational costs. For example, many 3×3 or 4×4 convolutions may be performed. It is desired to provide high speed operations on smaller sized data words while maintaining or increasing the same data throughput.

Current computational processors are based on 32-bit or 64-bit data architectures. High performance processors may use a multi-core processor architecture which allows each processor core to handle an independent thread, where each independent thread is independently executing on each processor core. Multiple thread processor architectures provide similar functionality with a single processor core, where a program counter which delivers thread-specific instructions and computational results are carried forward in the pipeline to subsequent pipeline stages, and utilize thread-specific register sets which are invoked for each stage needing access to the registers for a respective thread, to maintain separation of internal data processes for each thread, where the register set for each thread stores per-thread results for immediate computational use by each thread. The advantage of multi-thread processor architectures is that an I/O stall of one thread waiting for an external device to respond has no effect on the other threads. Single Instruction stream Multiple Data stream (SIMD) have the characteristic of interleaving a single processor which executes interleaved independent instructions such as thread-specific instructions. Multiple Instruction Multiple Data (MIMD) architectures operate on multiple threads using separate independent processor units or processor elements.

Maximizing the throughput of an SIMD processor typically requires a large data bus width and large number of register files to take advantage of the SIMD architecture. Scaling this architecture to greater capacity utilizes multiple processor cores inside additional separate processors which coordinate the execution of sub-tasks to solve a numerical problem. In contrast, low power applications such as Internet of Things (IoT) devices dictate a small silicon area, which is associated with low power consumption.

Embedded processors which utilize single or multiple thread architectures operate using in-order issue and in-order completion architectures because of their simplicity, low power consumption, and flexibility in updating the program, such as by internet program file download and flash memory storage. In this environment, the maximum Instruction Per Cycle (IPC) is 1.

OBJECTS OF THE INVENTION

A first object of the invention is a pipelined multi-thread processor having per-thread instruction execution granularity, the multi-thread processor operative on a data word width, the multi-thread processor having a thread mode where instructions are executed on each thread at the granularity of the data word width, the multi-thread processor also having a micro-thread mode where two independent instructions are simultaneously executed on the data word width, each of the independent instructions updating separate respective status registers for indicating an instruction result in micro-thread mode.

A second object of the invention is a pipelined multi-thread processor operative in a thread mode and in a micro-thread mode, the pipelined multi-thread processor comprising:

a thread identifier generating a thread_id;
a register file and a program counter;
instruction memory containing executable instructions;
the thread_id selecting an associated register file, an associated program counter;
the program counter issuing an instruction to a fetch stage coupled to a decode stage;
the decode stage coupled to an EX1 stage;
the EX1 stage coupled to an EX2 stage and an LS stage;
the EX2 stage and LS stage coupled to a Write Back stage;
the Write Back stage coupled to the register file;
the LS stage operable to read and write to a data memory;
the decode stage having a micro-thread instruction decoder operative during a micro-thread mode and decoding two micro-thread instructions from an instruction provided by the fetch stage;
the decode stage also having a thread mode and decoding a single instruction from an instruction provided by the fetch stage.

SUMMARY OF THE INVENTION

A pipelined multi-thread microprocessor has a thread_id generator, a per-thread register file, a per-thread status register indicating computational results, a per-thread program counter, instruction memory, and a series of pipeline stages. The pipeline stages include a Fetch stage, a Decode stage, an EX1 (first execution) stage, an LS (Load/Store) stage, an EX2 (second execution) stage, and a WB (write-back) stage. The thread_id generator selects a thread-specific program counter, which identifies an instruction from the instruction memory that is forwarded to the fetch stage, and the fetch stage forwards the instruction to a decode stage. The decode stage has a thread mode for decoding a single instruction and a micro-thread mode for decoding two or more instructions simultaneously, the decode stage sending the instruction to the first execution stage EX1 and second execution stage EX2. When executing a single instruction in a thread mode, the EX1 and EX2 stages perform a single arithmetic or logical operation. When executing in micro-thread mode, the instruction is executed simultaneously as two separate instructions with independent operations. The micro-thread mode has two separate control registers for saving the result of each arithmetic or logical operation (such as carry in, carry out, zero, greater than, lesser than, etc), and also has a control register for similar status results in the thread mode. An executed instruction in thread mode changes the hardware operations of the processor into micro-thread mode, and a different executed instruction in micro-thread mode changes the hardware operations of the processor into thread mode. In one example of the invention, at least some of the computational instructions and operations supported in micro-thread mode are half the width of the data operations supported in thread mode.

DETAILED DESCRIPTION OF THE INVENTION

A dual thread or multi-thread microprocessor provides for two or more threads to be executed on the microprocessor simultaneously. For two thread execution, one of the two threads occupies alternating pipeline stages and the other thread occupies the other stages. For example, for threads T0 and T1 executing in processor stages S1 S2 S3 S4 S5 will be executing T0 T1 T0 T1 T0 at a first cycle, and then executing T1 T0 T1 T0 T1 on the next cycle, with the associated instruction of each thread advancing through the processor. If the thread 0 (T0) instruction is issued in cycle N, then thread 1 (T1) instruction is issued in cycle N+1. With the addition to a single thread processor of a thread identifier to assign thread ID to a first stage, a thread-specific program counter, and thread-specific registers, a dual thread microprocessor can improve the efficiency and operational processing time, since the other hardware employed to implement the dual thread is common to the single thread in-order single issue pipeline microprocessor. Even in a 32-bit microprocessor architecture, many logical operations such as arithmetic operations, logical operations such as bitwise AND, OR, or Exclusive Or (XOR) or shift operations can be implemented in 16-bit compact instructions. The present dual thread microprocessor has two sets of 32-bit wide register files, each register file consisting of 16 registers for the register file to support dual thread operation and full thread independence.

Figure 1:
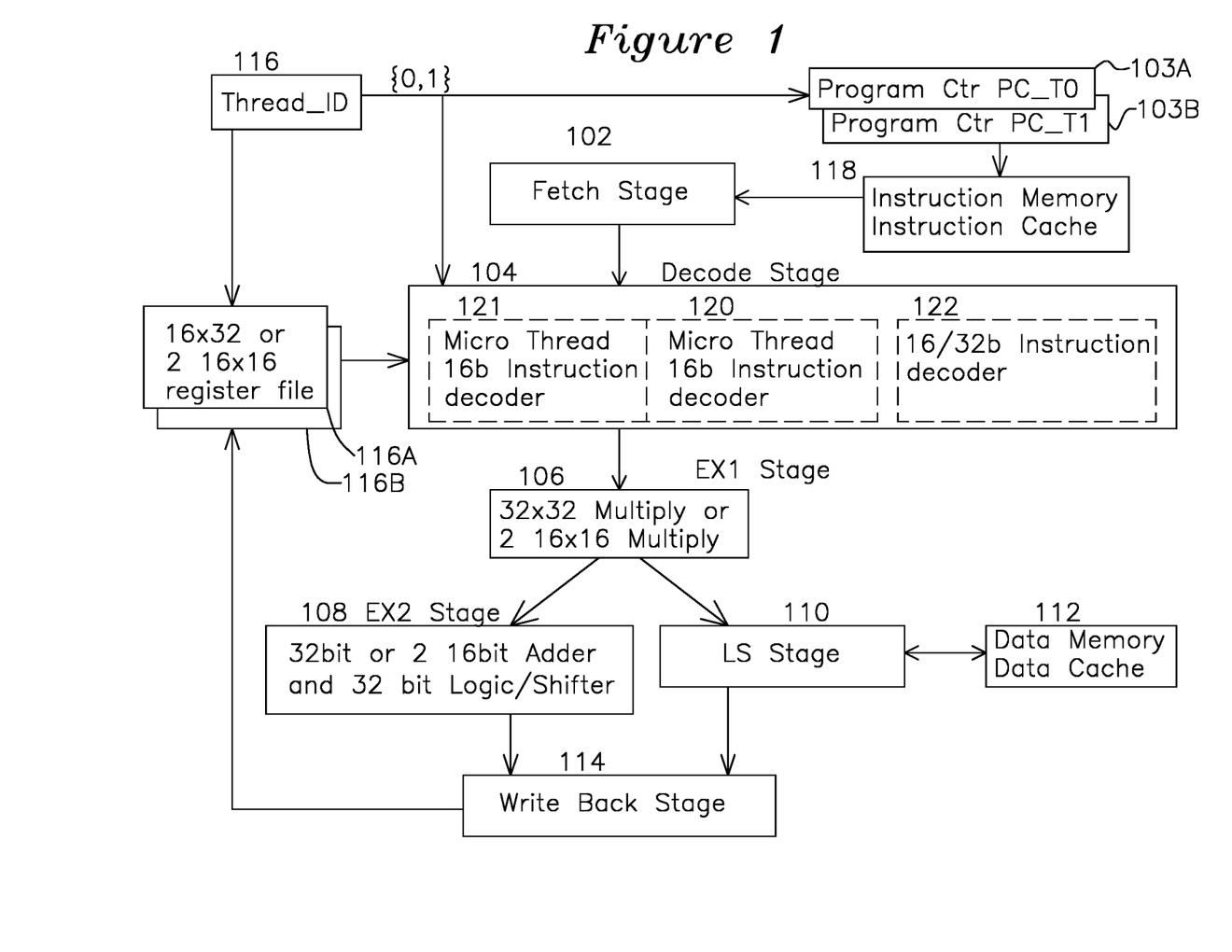
FIG. 1 is a block diagram of a pipeline processor having a dual instruction decode stage.

FIG. 1 shows an example microprocessor according to an aspect of the present invention, consisting of a plurality of pipeline stages, including Fetch stage 102, Decode stage 104, first execution stage EX1 106 which is operative to perform multiplication operations, second execution stage EX2 108 or alternatively Load or Store (LS) stage 110, and Wire Back WB Stage 114.

The Fetch stage 102 retrieves an instruction from the instruction memory. A word (32-bit) is fetched from the instruction memory or instruction cache 118 addressed by the thread-specific program counter PC (for thread 0 or T0) 103A, and the PC for T0 103 increases by 1 if the instruction is 16-bit. If the instruction is 32-bit, the PC 103A increases by 2. The example processor maintains 2 Program Counters (PC) 103A and 103B, since the multi-thread processor of FIG. 1 is operative on two program threads T0 and T1, and each thread is independently executed.

The Decode stage 104 creates control signals and operands for the EX1 stage 106, the EX2 stage 108 and Load-Store (LS) stage 110. The Decode stage 104 consists of 16-bit instruction decoder 120 and 121 for micro-thread mode, 16/32-bit instruction decoder 122 for thread mode, and an operand decoder which parses the source operand and destination operand of each instruction, such as determining whether the operand is an immediate value (part of the instruction) or a register value retrieved from register file 116A/B, and performs register read operations to retrieve any register values required by the decoded instruction. Each 16/32-bit instruction when decoded 122 creates control signals for the EX1 stage 106 if the instruction is valid. Most instructions have two source operands (such as registers R1 and R2 of per-thread register file 116) and one result operand. The source operands can be obtained from the register file 116 or immediate value contained in the instruction itself, or a result from earlier instruction which has not yet completed. The operand decoder part identifies the actual operand for EX1 stage 106.

In one example of the invention, the number of register files equals the number of thread ids (shown as 2 or illustration purposes only), the number of registers in the register file 116 example is 32, and each register is 32 bits wide, all of which are example values shown to illustrate the invention rather than to limit its scope to only the values shown. Each instruction thread (a set of executed instructions executing independently in its own thread and not affected by instructions executing on a different thread) is operative within its own context of 16 32-bit registers, such that the register file read or write operations are directed to the associated thread_id. Data in register file 116 is read by the decode stage 104 and written back in the Writeback (WB) stage 114. Each set of register file has 3 read ports for Multiply-And-Accumulate (MAC) operands and 2 write ports for MAC or Multiply (MUL) results or load data with address update. Three read ports are employed for multiply accumulate operations operating in single 32 bit instruction thread mode, whereas in a micro-thread mode performing two 16 bit multiply operations simultaneously, the third read port is not needed because the multiply operation is one of a smaller set of opcodes which does not support the third read port, as the number of opcodes is reduced by the shorter 16 bit opcode length in micro-thread mode.

The first execution (EX1) stage 106 performs arithmetic, logic and shift operations or passing the operand to EX2 108 or Load/Store (LS) stage 110. The EX2 stage 108 may complete multiplication operations started in EX1 106 or addition operations of Multiplication-And-Accumulation (MAC) started in EX1 stage 106, or simply passing operands to the WB stage 114 for storing into the register file 116. In one example of the invention, multiplication and MAC instructions take 2 execution cycles (one execution cycle each from EX1 and EX2) of operation to complete. The Load/Store LS stage 110 accesses external data memory 112. For a store operation, the external memory 112 address and data to be stored into external memory 112 are obtained from EX1 106. For load operations, the EX1 stage 106 provides the associated address. Based on the particular instruction, the address used by the LS stage 110 may be stored into the register file by the WB stage 114. The WB stage 114 stores data from computed by the EX2 stage 108 or from the EX1 stage 106 via LS stage 110, or from the LS stage 110 received from the external memory 112 into the register file 116.

In an example of the invention, the EX1 stage 106 and EX2 stage 108 have a 32-bit arithmetic logic unit (ALU) which provides a 32-bit multiply and accumulate spanning the EX1 and EX2 stages. In an example of the present invention, the opcode instruction set may consist of 16-bit and 32-bit instructions, of which approximately 70% of opcode instructions are 16-bit wide, and more than 50% of the opcode instructions are ALU instructions (add, subtract, shift, invert, AND, OR, rotate), and Multiply-accumulate (MAC) instructions. The total of ALU instructions and MAC instructions can be approximately 30-50% of the overall instruction set. The number of ALU and MAC opcode instructions will typically be higher when the application is more data intensive. In order for the processor pipeline to be optimized, and because the ALU/MAC stage has the greatest complexity, the maximum number of instructions per cycle (IPC) in each stage is 1, as is understood in superscalar processor architectures. Because of thread stalls caused by a cache memory miss or latency delay while accessing external memory, the actual average number of instructions per cycle will be less than 1. An important consideration in optimizing the processor design is the dramatic effect a thread stall may have, where an external access such as load or store operation in LS stage 110 has to wait for availability of external memory 112. In this case, the entire thread pipeline is stalled waiting for the availability of external memory 112. For this reason, multiple threads are advantageous, as the other threads continue operation and in their own context while the first thread waiting for external memory is stalled.

Emerging applications of processors such as IoT, Artificial Intelligence (AI) and Machine Learning (ML) require high performance with lower power consumption, particularly for battery powered operation, or where a large number of processors are required to perform a task, thereby increasing a heat load and energy requirement.

Machine learning has specific requirements which are new. In the past, greater resolution of acquired analog data, and processing techniques which reduce noise by temporal averaging provided greater resolution of sensor data, requiring wider data busses. In machine learning, inferences can be constructed using much smaller resolution data, but which must be processed in parallel. A typical single MAC operation in ML is either 3 bit by 3 bit multiplication or a 4 bit by 4 bit multiplication, but over many multiply-accumulate operations may result in a full 32 bit accumulated result. Accordingly, machine learning applications require greater flexibility of operations for smaller numbers of bits (such as 3 or 4 bit operations) while preserving traditional 32 bit operations.

A difficulty which arises when doing 3 or 4 bit operations is that the operations use the entire 32-bit data path of the ALU or MAC, one instruction operating on one full register width at a time. Reducing the processor bit-width to fit smaller than 32 bit data then does not allow the processor to handle 32 bit data, and even then, the instructions per cycle (IPC) remains fixed, and the alternative of adding additional microprocessors to the chip increases the silicon area budget and power consumption.

In the present invention, the architecture provides for multiple smaller data instructions to be simultaneously executed on each instruction cycle, and on a per-instruction basis, and without adding additional complexity when the data bit width is small, while allowing the dual thread operations and also providing multiple instructions to be simultaneously executed on smaller data widths.

Many computationally intensive algorithms for Machine Learning use register operands or immediate (included with the opcode instruction) operands. Further, most ML ALU operations are arithmetic/logic/shift operations which store the result locally into the register file 116. Further, many ML operations involve looping until new data is required or data production ends and a result is send out to external memory 112 by the LS stage 110.

An example of processing in micro-thread mode is described below:

Fetch stage 102: (Thread 0) Fetch one 32-bit word from the instruction memory 118. In the word, there are two 16-bit instructions.

Decode stage 104: (Thread 0) reads the opcode, which uses dual 16-bit ALU/MUL/Shift instructions, and generate 2 pairs (2×2) register file addresses, one pair for each instruction.

Decode stage 104: (Thread 0) Register file 116 provide 4 operands and each operand is 16-bit wide. In an example of the invention, a 16 32-bit register file acts as 2 sets of 16 16-bit register file.

EX1 stage 106 and EX2 stage 108: (Thread 0) have an internal architecture and mode invoked by the opcode which supports split two 16-bit ALU/MUL operations performed in a single instruction step (micro-thread mode) or a single 32-bit ALU/MUL operation (thread mode) for a conventional mode of operation also identified by the opcode.

WB stage 108 for split 16 bit operations: (Thread 0) perform a write back operation of resulting computed data from each split operation to register file 116.

Below are examples of the types of operations which can be performed by the new architecture.

In a first example for simultaneously accumulating 8 bit values in a micro-thread mode, registers R4 to R15 may contain 8 bit values, which are stored in a 32 bit format with sign extended to preserve the sign when performing signed numeric operations such as additions. A series of subsequent add-accumulate instructions operate on each subsequent register value and in a final step store a final summation R4 into an external memory 112 location.

In a second example of the invention, registers R4 to R15 are filled with 8 bit values using 32 bit sign extension to perform (R4*R5+R12)+(R6*R7+R13)+(R8*R9+R14)+(R10*R11+R15) saved into R5. In this example, the operations are to perform MUL (R4, R5) and ADD R12, MUL (R6, R7) and ADD R13, MUL(R8, R9) and Add R14, MUL(R10, R11) and Add R15, then sum all and put into R5. In this example, MUL is a multiply instruction, ADD is an addition instruction, and the references which follow an instruction are register operands.

Performing the second example on a thread mode processor, without the micro-thread mode of the present invention would take 48 cycles: 24 cycles for the 1st part (12 load cycles+11 add cycles+1 store) and 24 cycles for the 2nd part.

Performing the second example on a micro-thread mode of the present invention requires only 26 cycles compared to the thread mode 48 cycles. The present invention using the micro-thread architecture requires 12 cycles for loading data for the 1st and 2nd part together (vs 24 cycles for the prior art method)+11 add cycle operations+1 store operations+plus 2 instruction cycles, one for the regular thread instruction to enter micro-thread mode, and a micro-thread instruction to return to the regular thread mode. The 12 load cycles of load and 1 store instructions are not part of micro thread instruction, which provides additional synchronization advantages between the two micro-threads. Since we have two 16 bit instructions in a 32 bit word which is retrieved as an integral instruction, and a cache which operates on 32 bit accesses, the system retrieves the two 16 bit instructions simultaneously, either from program memory or from cache, so the two micro-threads have exactly the same execution times without thread stalls of external memory accesses, so the two micro-threads maintain synchronization with each other.

Figure 2A:
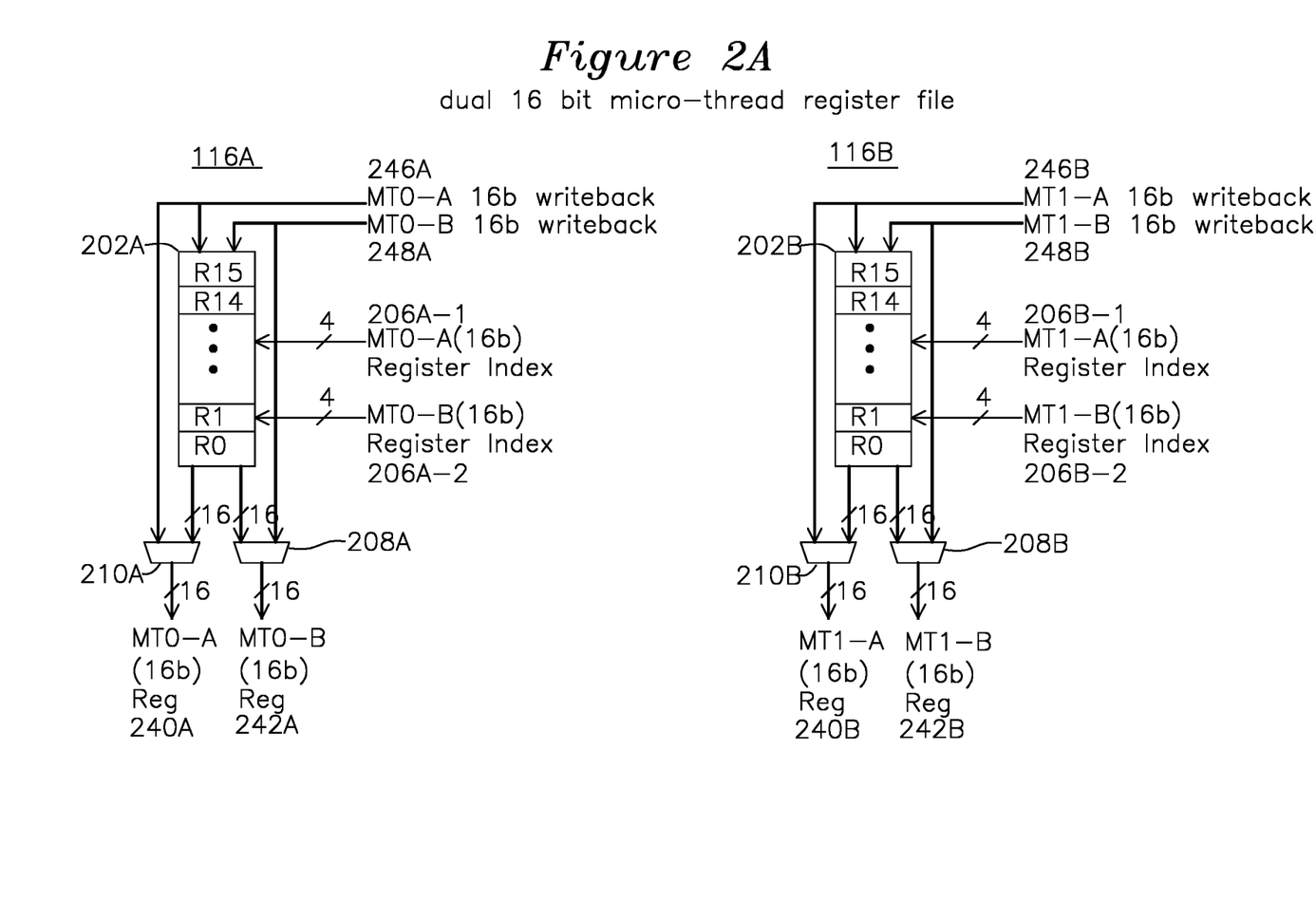
FIG. 2A is a block diagram showing instruction handling for an example 32 bit instruction.
Figure 2B:
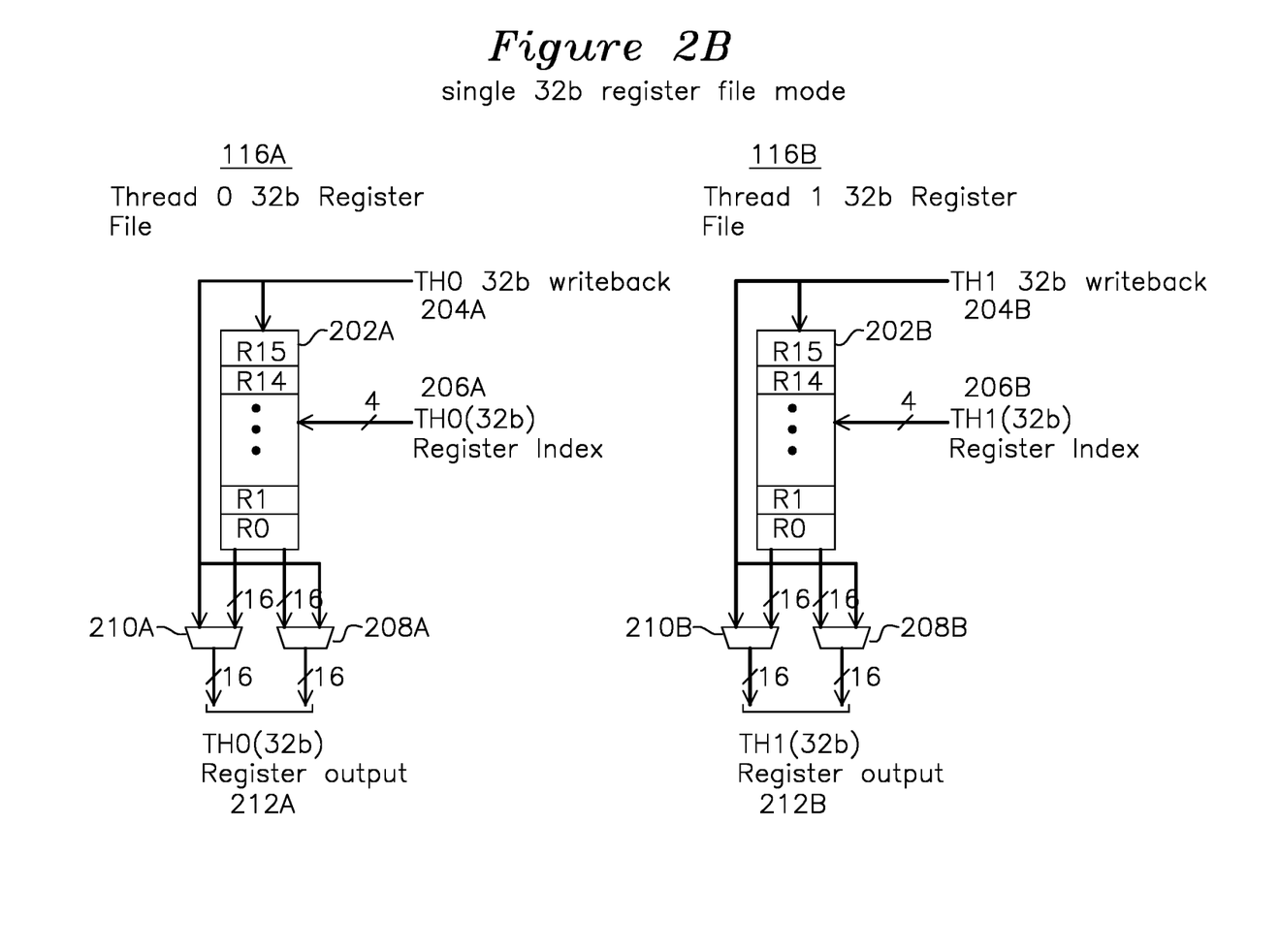
FIG. 2B is a block diagram showing instruction handling for an example dual 16 bit instructions.

FIGS. 2A and 2B shows an example block diagram for operation of the register files 116A for thread 0 and register files 116B for thread 1 in various modes. FIG. 2A shows in the operation of the register file in a micro-thread mode, where each micro-thread is operable to perform simultaneous 16 bit arithmetic operations using the 32 bit registers which are independently addressable. Thread 0 microthreads are addressed using address inputs 206A-1 206A-2 and thread 1 micro-threads are addressed using address inputs 206B-1 and 206B-2. In this micro-thread mode, thread 0 has 16 bit micro-thread inputs 246A, 248A and 16 bit micro-thread outputs 240A and 242A, and thread 1 has 16 bit micro-thread inputs 246B and 248B and 16 bit micro-thread outputs 240B and 242B. Multiplexers 210A and 208A for thread 0 and 210B and 208B for thread 1 are used to select register data or data directly from the writeback inputs 246 and 248.

FIG. 2B shows the structures of FIG. 2A configured for 32 bit operation. In this mode, the register file is addressed by 206A and 206B for threads 0 and 1, respectively. The 32 bit inputs 204A and 32 bit outputs 212A for thread 0 and 32 bit inputs 204B and 32 bit outputs 212B for thread 1 operate as before, with multiplexers 210A, 210B, 208A and 208B operating to select between writeback data and register data, as in FIG. 2A for micro-thread mode.

As a convention, the threads are referred to as T0 and T1 for at two thread example. In a micro-thread mode, thread T0 and/or T1 can issue two instructions per cycle, referred to as mT0 and mT1 for each respective thread in microthread mode, with suffix A or B indicating a particular micro-thread. Accordingly, thread T0 in a micro-thread mode will have micro-threads T0_mT0 and T0_mT1, and thread T1 similarly operates independently in either a thread (32 bit) mode T1 or micro-thread mode with micro-threads mT0 and mT1.

FIG. 1 decode stage 104 indicates the decoder operation with two micro-thread instruction decoders 121 and 120 for micro-thread mode, or as a single thread 122 for thread mode. The EX1 stage 106 is configured to either multiply 32×32 operands in a thread mode, or two 16×16 multiplications in a micro-thread mode. Similarly, the EX2 stage has a first thread mode for 32 bit operations and a second micro-thread mode for two 16 bit operations. The operations of the EX2 stage include arithmetic operations such as addition, right and left bit shifting, where the number of arithmetic and logical opcodes available in a micro-thread dual 16 bit mode is a subset of those available in a thread 32 bit mode.

The register file 116A and 116B provides register values to the decoder stage 104 as 32 bit values in a thread mode, or as separately addressed 16 bit values in a micro-thread mode, each 16 bit value addressed independently for each micro-thread register request.

The instruction opcode format for a 32 bit instruction may reserve a first group of bits to identify the specific instruction, one or more bits to specify an operand source (register value, immediate value, or addressed memory value), followed by additional bits which specify other operations or aspects. When the instruction opcode format is changed to provide two independent 16 bit instructions, the number of bits available for each field is halved. Accordingly, the number of different micro-thread 16 bit ALU instructions is comparatively limited. Example mT0 and mT1 instructions are shown below.

A first class of 16 bit machine instruction operating entirely on register values comprises a 4 bit opcode followed by Rd (4 bits indicating destination register), followed by Rs1 (4 bits indicating a first source register), followed by Rs2 (4 bits indicating a second source register). The 16 bit machine instruction comprises 4 bits of each of the opcode, Rd, Rs1, and Rs2.

A second class of 16 bit machine instruction operating on immediate values (the values are part of the machine instruction) is a 4 bit opcode, followed by a destination register Rd identified by 4 bits, followed by a source register Rs1 (same as Rd), followed by an 8 bit value used in the instruction. The below table lists the instructions:

| instruction | Dest | Src1 | Src2 |
|---|---|---|---|
| ADD (register add) | Rd | Rs1 | Rs2 |
| ADDI (immediate add) | Rd | Rs1 | IMM value |
| SUB (register subtract) | Rd | Rs1 | Rs2 |
| SUBI (subtract immediate) | Rd | Rs1 | IMM value |
| MULH (multiply high) | Rd | Rs1 | Rs2 |
| MULL (multiply low) | Rd | Rs1 | Rs2 |
| MULIH (multiply immediate high) | Rd | Rs1 | IMM value |
| MULIL (multiply immediate low) | Rd | Rs1 | IMM value |
| MOV (register move) | Rd | Rs1 | |
| MOVI (register immediate value move) | Rd | IMM value | |
| AND (logical AND) | Rd | Rs1 | Rs2 |
| OR (logical OR) | Rd | Rs1 | Rs2 |
| COMP (arithmetic compare) | Rs1 | Rs2 | |
| SFTR (Shift right 1 bit) | Rd | Rs1 | |

MULH, MULL produces 32-bit result internally and MULH stores upper 16-bit result into the register file Rd and MULL stores lower 16-bit result into the register file Rd. COMP instruction updates only flags after comparing two operands. SFTR takes source operand from Rs1 register and one-bit shift righted data is stored into register Rd.

One example of the invention is a dual thread microprocessor, in a first thread mode of operation, a 32-bit instruction fetch is performed by fetch stage 102 using an associated T0 program counter (PC_T0) 103A and T1 program counter (PC_T1) 103B on a per-thread instruction fetch, where the thread operation may be alternating such as T0 T1 T0 T1 etc as governed by an alternating thread_id output by Thread_id generator 116 to select the associated register file 116A/B, Program Counter 103A/B, and decode stage 104. PC_T0 and PC_T1 each have associated program counters PC0 and PC1 for thread T0 and T1, respectively. PC0 and PC1 are pointers to locations in respective instruction memory 118 segments for T0 and T1, respectively. In one example of the invention, the instruction memory is 32 bit word aligned with 16 bit word granularity, and accordingly, each thread PC_T0 and PC_T1 value advances by 2 for each 32-bit instruction fetch when micro-thread mode is enabled. Alternatively, each program counter PC0 and PC1 may increment by any required granularity in addressing (1 address increment per 8 bit byte, or 1 address increment for 16 bit word, or 1 address increment for 32 bit word.

PC0 and PC1 do not differentiate between thread mode and micro-thread mode, such as whether a 32 bit thread mode instruction was fetched or 2 16-bit micro-thread instructions of HT0 and HT1 are fetched. If PC0 fetches micro thread instructions, then the instructions at PC0 and PC0+1 associates to T0_mT0 (Thread 0 micro-thread 0) and T0_mT1 (Thread 0 micro-thread 1). For a 32 bit system in micro-thread mode and delivering a pair of 16 bit micro-thread instructions, the subsequent instruction address from PC0 associated with T0_mT0 is PC0+2 and the next instruction of PC0+1 associated with T0_mT1 comes from PC0+3.

Micro-thread mode operation is enabled by assertion of the hardware signal MT_EN, and micro-thread ends with de-assertion of MT_EN. In one example of the invention, a special program instruction executed in a thread mode initiates micro-thread operation by asserting MT_EN (micro-thread enable), and a different special program instruction executed in a micro-thread mode ends micro-thread mode operation and returns to thread mode operation by de-asserting MT_EN. MT_EN can be asserted and de-asserted independently on a per-thread basis.

Since the two separate 16 bit micro-thread instructions retrieved in each 32 bit instruction memory access need to be decoded simultaneously when MT_EN is asserted, additional duplicated decoding logic is employed to support the per-micro-thread instructions for use with T0 or T1 in micro-thread mode. The decode stage 104 logic is mostly combinational circuit so consequently, the overall area increase in silicon area from this duplication of decoding logic is minimal. In a thread mode, T0 and T1 each thread independently accesses the register file 116A and 116B, respectively, and perform a single decode in stage 122. In a micro-thread mode, the micro-thread instruction decoders 120 and 121 are operate, as determined by MT_EN signal which is asserted after execution of a thread instruction or de-asserted after execution of a micro-thread instruction. In one example of the invention, the register file is shared in thread mode and micro-thread mode. For a data word width of 32 bits and 16 registers, the arithmetic and logical operations on thread mode are standard 32 bit operations on the 16 registers, and in micro-thread mode, the register file is split into two independent 16 bit register files, each set of 16 bit register files operable on a particular one of the micro-threads. In this example, each micro-thread has available the same number of accessible registers and each register file width is 16-bit during micro-thread mode operation vs 32 bit during thread mode operation.

In one example of the invention, the micro-thread mode instruction set is a subset of the regular thread mode instruction set, as described in the previous table of instructions, and each micro-thread 16 bit instruction is able to operate on an immediate value (a value provided in the machine instruction itself) or a register file value as the operand (such as R0 to R15, which are commonly shared in micro-thread mode and thread mode). Load-and-store operations (memory accesses to data memory 112 or external memory) are not included in the micro-thread instruction set of the table previously presented because the load-and-store operations require an address calculation which leads to more than 16-bit address supported by the limited addressing range of the micro-thread mode instruction. In thread (32 bit instruction/operand) mode, the forwarding of operands is performed, such as the case of an computational result written to a register via the WB stage 114 and also required by a subsequent instruction before its availability from the register. The present micro-thread architecture avoids such conflicts by excluding load and store operations to external memory. In micro-thread mode, operand related data forwarding logic is required, but the incremental complexity will be less than required for thread mode. Operand forwarding is used when the result of a current arithmetic operation is sent to the write back stage 114 and is also required in a subsequent instruction before the result has been stored in the register file. Further, the speed impact of instructions executed in micro-thread mode will be minimal since load-and-store operations are excluded from the available instruction set for micro-thread mode operation, as micro-thread instructions operate only on register file or immediate operands. Thus, the only register file read operand comparisons result from EX2 or WB destination register file destinations, which may be provided by operand forwarding. An example of this is the case where a first instruction stores a result in register 1, and a subsequent instruction requires access to register 1 before the writeback stage 114 has completed writing the value to register 1. For example, ADD R1 R2 R3 with a subsequent instruction ADD R3 R4 R5 would result in the first instruction adding R1 and R2 together and storing the result in R3, but that R3 result would not be available for the subsequent addition of R4 to R4 to store in R5 until the writeback stage 114 updated R3. Operand forwarding would make R3 available to EX2 while WB 114 was updating the register file. Branch instructions and conditional system operations are not supported in micro-thread mode program execution, since conditional branch instructions require another set of program counter values associated with the conditional or unconditional branch and also can cause data bandwidth problems where both simultaneous conditional branches require simultaneous access of the branch address, which can only be done by sequential memory accesses. A separate set of control registers which have arithmetic result status flags for mT0 and mT1 are provided for the results of the arithmetic and logical operations, including flags for zero, sign, carry or overflow bits associated with operations performed on each separate micro-thread. These status flags can be set or cleared in micro-thread mode during arithmetic or logic operations and subsequently read or written in standard thread mode for threads T0 or T1.

The register file 116A and 116B provides 16 32 bit registers, which may be configured as 16 pairs of 16-bit registers, where each bank has a read port for A and B operands (shown as 240A/240B and 242A and 242B in micro-thread mode in FIG. 2A and 212A/212B in thread mode of FIG. 2B), and a write port (shown as 246A/246B and 248A/248B in micro-thread mode of FIG. 2A and 204A/204B in thread mode of FIG. 2B).

The register files 116A/116B of FIGS. 2A and 2b consists of 2 independent read ports and 1 write port. Thus, 2 operands can be read out from different locations and 1 operand can be stored during a single instruction cycle. For example, in micro-thread mode, mT0 may execute an instruction such as rd A0 and rd B0 where A0 and B0 are register file read pointers initialized by the operand of the instruction to indicate which register to read from, and wr C0 is a register write pointer. The register file associated with microthread 1 may simultaneously execute instruction which has operands rd A1, rd B1 and wr C1. During thread mode operations, rd A0 and rd A1, rd B0 and rd B1 and wr C0 and wr C1 will have same value to read and store 32-bit data. During micro-thread mode operations, all 6 ports rd A0, rd A1, rd B0, rd B1, wr C0 and Wr C1 can have different values.

The Data execution stages also support micro-thread split operations. For example, the 32-bit data ALU of EX2 stage 108 independently supports 2 16-bit ALU operations. Data shift right operations for each micro-thread are performed on a 16 bit half-word boundary.

Figure 3A:
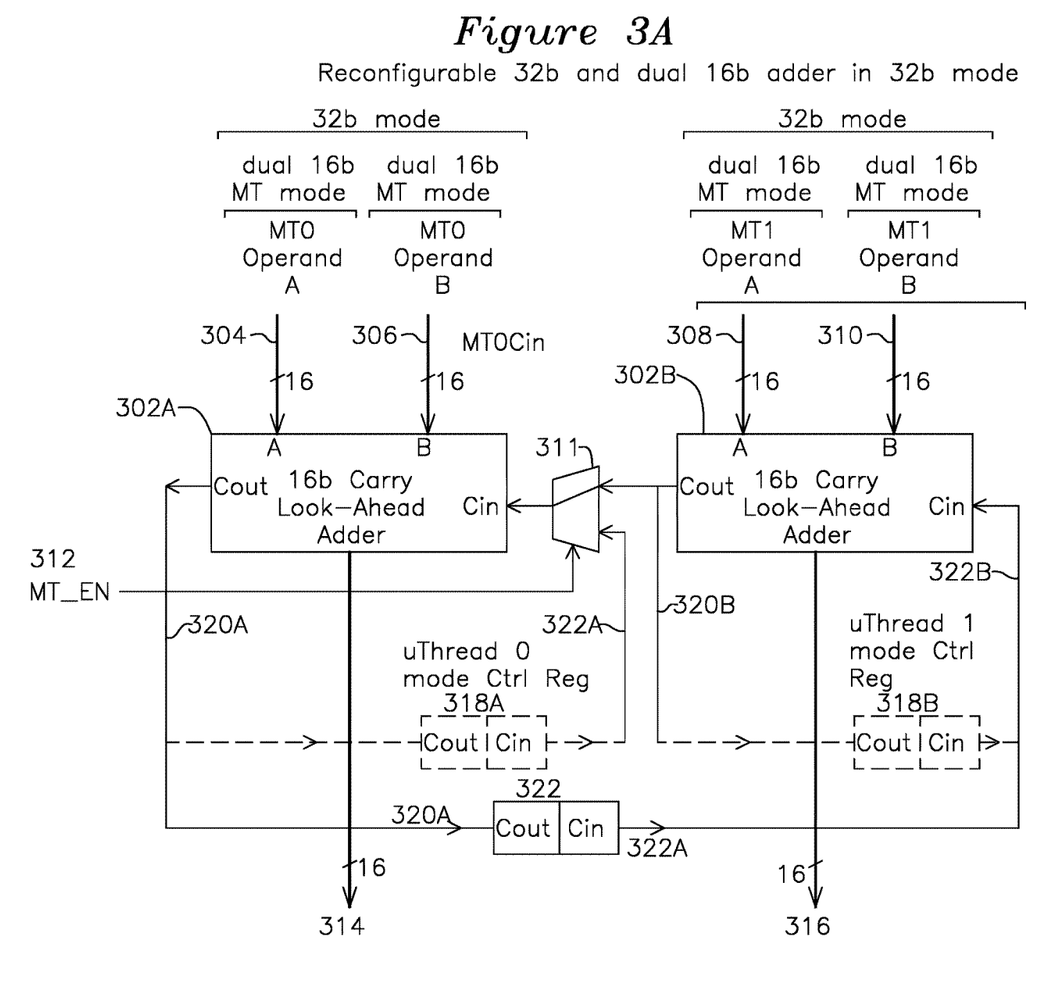
FIG. 3A shows a reconfigurable adder in 32 bit single adder mode.
Figure 3B:
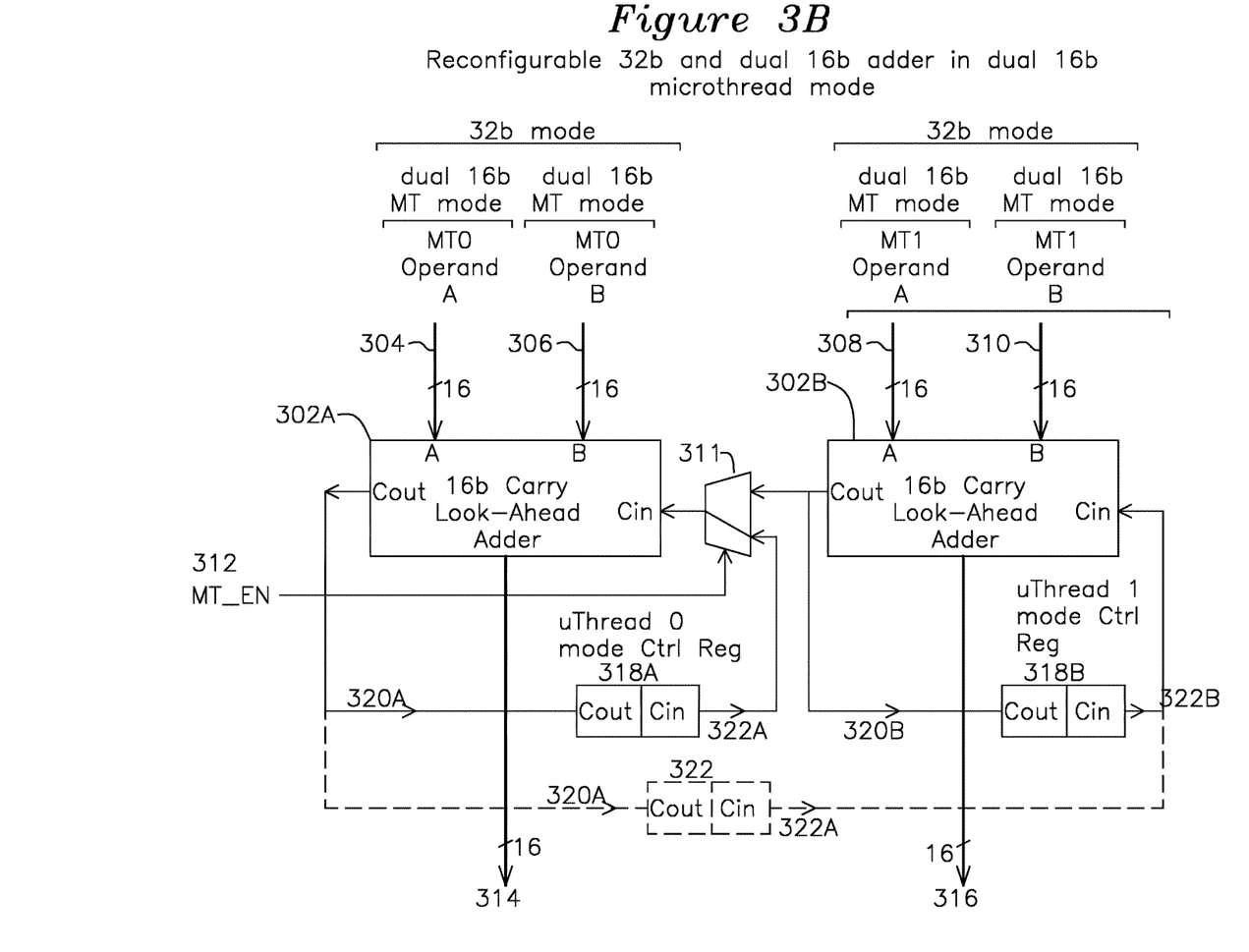
FIG. 3B shows a reconfigurable adder in dual 16 bit micro-thread mode.

FIGS. 3A and 3B show an example adder part of EX2 stage 108 adapted for micro-thread mode and thread mode operation. FIG. 3A shows the adder in a 32 bit thread mode, and FIG. 3B shows the adder configured for a dual 16 bit micro-thread mode. FIG. 3A shows a 32-bit adder is implemented using two 16-bit fast adders 302A and 302B, which propagate carry operations for 32 bit operation through mux 311 when MT_EN is not asserted. FIG. 3B shows the configuration of mux 311 when MT_EN is asserted, and where carry operations of adder 302A are connected to an associated micro-thread 0 ALU status register (such as Carry out or Carry in status bit 318A as shown or a zero status register bit not shown) when not the adders 302A and 302B are configured for split 16 bit micro-thread mode operations. In a thread mode where the adder is operative in a 32 bit adder mode as shown in FIG. 3A, the carry-out bit of the lower 16-bit adder is connected in the carry-in bit of the upper 16-bit adder through mux 311. In a micro-thread mode, the carry out bit of the lower 16 bit adder result is saved into the control register. In micro-thread mode, as shown, each upper 16-bit adder 302A and lower 16 bit adder 302B carry in bit is supplied from the micro thread status control register 318A and 318B which are specific to each micro-thread status value.

In a micro-thread mode, 16 by 16 multiplication operations limit the result to 32-bits. These multiplication operations can be implemented in two pipeline stages. The multiplication instructions MULL (multiply only the low 16 bits of a specified 32 bit register) and MULH (multiply high 16 bits of a specified 32 bit register) of the instruction table save only the upper or lower 16 bits of the 32-bit result. In a thread mode, the 32×32 multiplication produces 64-bit result that cannot be saved into a register file due to physical limitation of 32-bit write capability.

In one example of the invention for performing 32 bit multiplications using 16 bit operands, a 32 bit operand OPa may be represented in 32-bit as two 16 bit values such as $A*2^{16}+B$ and OPb in 32-bit as two 16 bit values $C*2^{16}+D$, where A and C are the upper 16-bits of 32-bit data and B and D are the lower 16-bits of 32 bit data. Then the multiplication of OPa multiplied by OPb is $A*C2^{32}+[B*D+C*A]2^{16}+B*D$, where A*C, B*D, A*C and B*D are all 32-bit precision. When used as 2 16×16 multiplication, MULL mT0 takes lower 16-bit of A*C and MULH takes upper 16-bit of A*C. While the MULH in mT1 takes upper 16-bit of B*D and MULL in mT1 takes lower 16-bit of B*D.

For the micro-thread mode of operations, separate control flags are needed for each micro-thread such as carry bit, zero bit and sign bit. These control bits are independent and are not shared. Thus, each of T0_mT0, T0_mT1, T1_mT0 and T1_mT1 has own control register separate from the control registers for T0 and T1.

Figure 4A:
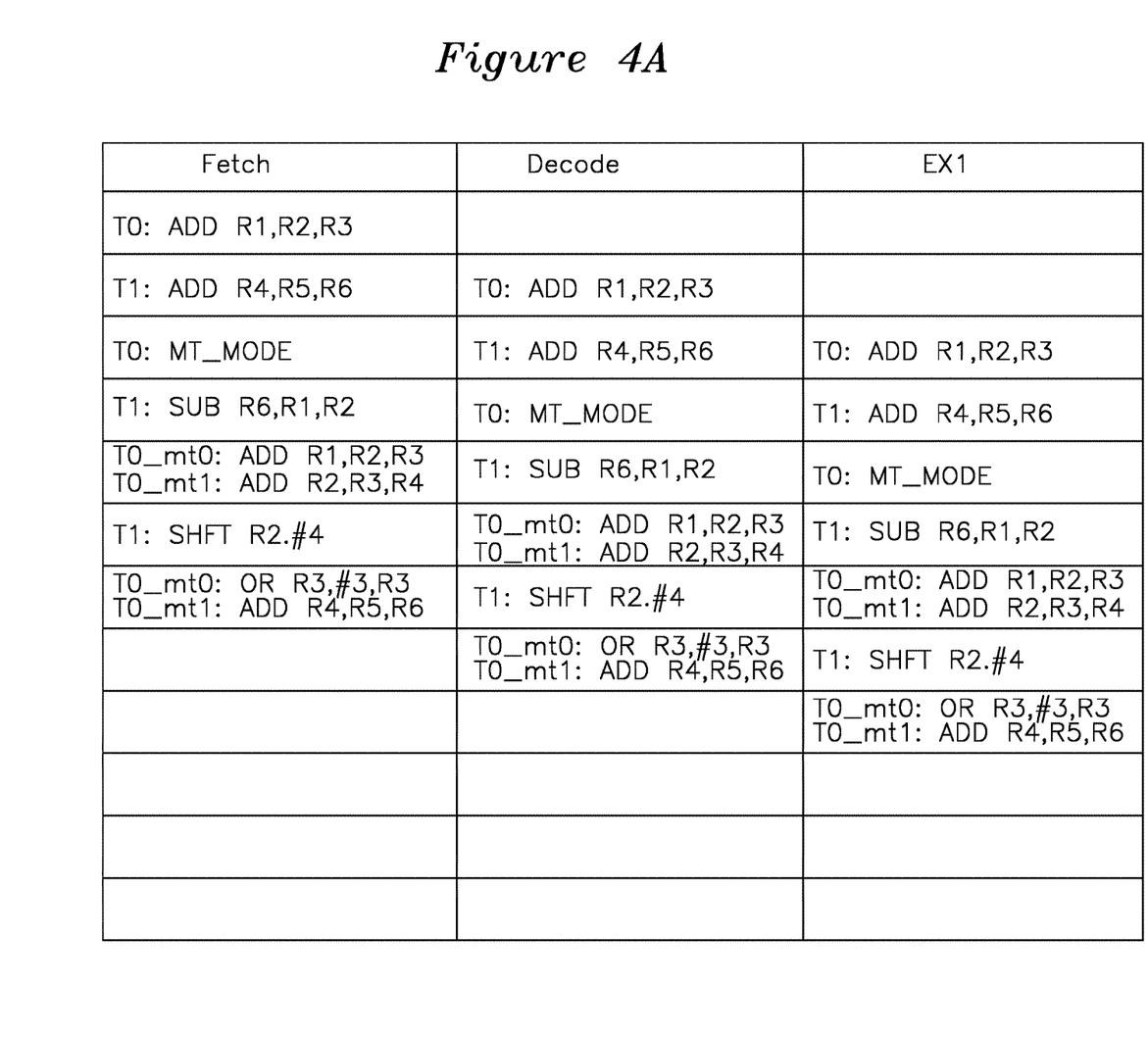
FIGS. 4A and 4B show a sequence of instruction execution through the pipeline stages of FIG. 1 in thread mode and micro-thread mode.
Figure 4B:
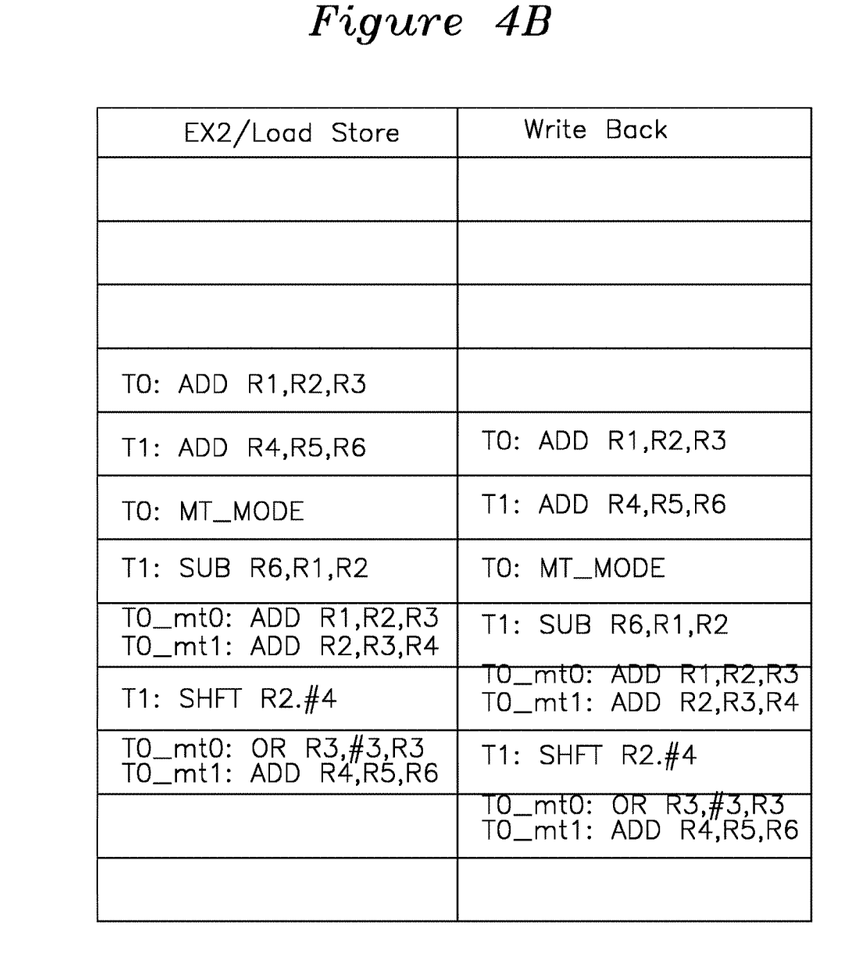

FIGS. 4A and 4B show a pipeline diagram that shows the progression through the stages of a thread mode for T0 and T1 for the first 3 cycles, followed by MT MODE instruction placing thread 0 into a micro-thread mode for subsequent instructions, as shown. FIG. 4B is understood to be a continuation of the timeline of FIG. 4A. The result after micro-thread mode is three independent threads (32 bit on T1 and two 16 bit on T0) by splitting T0 into 2 micro threads T0_mt0 and T0_mt1. Microthreads mT0 and mT1 are instruction fetched together and executed together on the pipeline.

This implementation has an advantage over dual issue microprocessor: the complexity of the overall hardware is much lower, since each thread on at the given cycle is independent from each other while the dual issue microprocess needs to check two instruction's inter dependency. Thus, we do not need any additional instruction interdependency checking or any instruction reorder during write-back stage.

An aspect of the invention is a multi-thread processor operative on a data word having a width, the multi-thread processor comprising:

a thread_id register generating a thread_id;

a plurality of program counters, each program counter associated with a thread_id;

a plurality of register files, each register file comprising a plurality of registers, each register file associated with a thread_id;

an instruction memory containing executable instructions;

a plurality of pipelined stages including a fetch stage operative to retrieve executable instructions from the instruction memory based on the program counter selected by the thread_id;

the fetch stage coupled to a decode stage, the decode stage having a thread mode and a micro-thread mode;

the decode stage operative to issue an instruction operative on the width of a data word in thread mode, and operative to issue two instructions for execution in parallel in a micro-thread mode;

the decode stage coupled to a first execution stage for performing a multiply instruction on the width of a data word in thread mode, or performing two multiply instructions in micro-thread mode;

a second execution stage coupled to the first execution stage when an executed instruction is for multiplication or logic operations, the second execution stage performing a single logic and arithmetic operation in a thread mode, and two simultaneous logic and arithmetic operations in a micro-thread mode;

a load and store stage coupled to the first execution stage when an executed instruction results in a request to read or write to a data memory through an interface;

a writeback stage coupled to the load and store stage when an executed instruction requires writing a result to a register of the register file;

the writeback stage coupled to the second execution stage when an executed instruction requires writing a result to a register of the register file.

In another aspect of the invention, a multi-thread processor comprises:

a thread_id generator issuing a thread_id;

a plurality of program counters, one program counter for each thread_id, each program counter issuing an address;

an instruction memory coupled to the plurality of program counters and containing instructions accessed by the address and the thread_id;

a plurality of register files, one register file for each thread_id, each register file comprising a plurality of registers;

a fetch stage receiving an instruction associated with the address from the instruction memory;

a mode register indicating a thread mode and a micro-thread mode;

the fetch stage coupled to a decode stage, the decode stage operative to decode a single instruction in the thread mode and at least two independent instructions in a micro-thread mode;

a first execution stage operative to perform a single multiply operation on two multiplicands in a thread mode and operative to perform two simultaneous and independent multiply operations in a micro-thread mode, each independent multiply operation performed on two multiplicands, the first execution stage also having a bypass mode for non-multiply operations;

a second execution stage coupled to the first execution stage, the second execution stage operative to perform logical operations and arithmetic operations on results from the first execution stage; a writeback stage coupled to the second execution stage, the writeback stage operative to write result values from the second execution stage to a register of the register file;

a load store stage coupled to the second execution stage and accessing external memory, the load store stage also coupled to the write back stage for writing values from external memory to a register of the register file.

The present examples are provided for illustrative purposes only, and are not intended to limit the invention to only the embodiments shown.

I claim:

1. A multi-thread processor operative on a data word having a width, the multi-thread processor comprising:
   a thread_id register generating a thread id;
   a plurality of program counters, each program counter associated with a thread_id;
   a plurality of register files, each register file comprising a plurality of registers, each register file associated with a thread_id;
   an instruction memory containing executable instructions;
   a plurality of pipelined stages including a fetch stage operative to retrieve executable instructions from the instruction memory based on a respective program counter selected by a respective thread_id;
   the fetch stage coupled to a decode stage, the decode stage having a thread mode and a micro-thread mode;
   the decode stage operative to issue an instruction operative on the width of a data word in thread mode, and operative to issue two instructions for execution in parallel in a micro-thread mode;
   the decode stage coupled to a first execution stage for performing a multiply instruction on the width of a data word in thread mode, or performing two multiply instructions in micro-thread mode;
   a second execution stage coupled to the first execution stage when an executed instruction is for multiplication or logic operations, the second execution stage performing a single logic and arithmetic operation in a thread mode, and two simultaneous logic and arithmetic operations in a micro-thread mode;
   the second execution stage having a status register for a result of a logical or arithmetic operation in a thread mode, and two separate status registers for two independent logical or arithmetic operations in a micro-thread mode;
   a load and store stage coupled to the first execution stage when an executed instruction results in a request to read or write to a data memory through an interface;
   a writeback stage coupled to the load and store stage when an executed instruction requires writing a result to a register of a respective register file;
   the writeback stage coupled to the second execution stage when an executed instruction requires writing a result to a register of a respective register file.

2. The multi-thread processor of claim 1 where the width is 32 bits.

3. The multi-thread processor of claim 2 where at least one register of a respective register file contains a single 32 bit value for use by the first execution stage or the second execution stage in a thread mode, and at least one register of a respective register file contains two 16 bit values for use by the first execution stage or the second execution stage in a micro-thread mode.

4. The multi-thread processor of claim 1 where the first execution stage performs a single multiply operation in a thread mode and performs two simultaneous independent multiply operations in a micro-thread mode.

5. The multi-thread processor of claim 1 where the second execution stage performs a single logical or arithmetic operation in a thread mode and performs two simultaneous independent logical or arithmetic operations in a micro-thread mode.

6. The multi-thread processor of claim 1 where the first execution stage or the second execution stage has a reconfigurable adder comprising two adders, each adder having a carry input and a carry output, the reconfigurable adder operative in a thread mode where a first adder carry output is coupled to a second adder carry input, the reconfigurable adder operative in a micro-thread mode where the first adder carry output is coupled to a first micro-thread status register carry out bit and the second adder carry input is coupled to a second micro-thread status register carry in bit.

7. The multi-thread processor of claim 6 where in micro-thread mode, the first adder carry input is coupled to a carry in bit of the first micro-thread status register, and the second adder carry output is coupled to a carry out bit of the second micro-thread status register.

8. The multi-thread processor of claim 6 where the first adder carry output is coupled to the second adder carry input through a multiplexer when a micro-thread enabled bit is set.

9. The multi-thread processor of claim 1 where at least one instruction stored in the instruction memory is a micro-thread enable instruction which causes the first execution stage or the second execution stage to operate on subsequently received instruction from a micro-thread mode instruction set comprising two independent arithmetic or logic instructions, each independent arithmetic or logic instruction present on half of the width.

10. The multi-thread processor of claim 1 where at least one instruction stored in the instruction memory is a thread enable instruction which causes the first execution stage or the second execution stage to operate on subsequently received instructions from a thread mode instruction set comprising single arithmetic or logic instructions on the width.

11. A multi-thread processor comprising:
    a thread_id generator issuing a thread_id;
    a plurality of program counters, one program counter for each thread_id, each program counter issuing an address;
    an instruction memory coupled to the plurality of program counters and containing instructions accessed by the address and the thread_id;
    a plurality of register files, one register file for each thread_id, each register file comprising a plurality of registers;
    a fetch stage receiving an instruction associated with the address from the instruction memory;

the multi-thread processor having a thread mode and a micro-thread mode;

the fetch stage coupled to a decode stage, the decode stage operative to decode a single instruction in the thread mode and at least two independent instructions in a micro-thread mode;

a first execution stage operative to perform a single multiply operation on two multiplicands in a thread mode and operative to perform two simultaneous and independent multiply operations in a micro-thread mode, each independent multiply operation performed on two multiplicands;

a second execution stage coupled to the first execution stage, the second execution stage operative to perform logical operations and arithmetic operations on results from the first execution stage;

the second execution stage having a status register for a result of a logical or arithmetic operation in a thread mode, and two separate status registers for two independent logical or arithmetic operations in a micro-thread mode;

a writeback stage coupled to the second execution stage, the writeback stage operative to write result values from the second execution stage to a register of a respective register file;

a load store stage coupled to the second execution stage and accessing external memory, the load store stage also coupled to the write back stage for writing values from external memory to a register of a respective register file.

12. The multi-thread processor of claim 11 where the thread_id is one of a plurality of n values which are provided in a canonical sequence.

13. The multi-thread processor of claim 11 where at least one of the fetch stage, the decode stage, the first execution stage, the second execution stage, the load store stage or the write back stage receives a value from a pipeline register coupled to a previous stage.

14. The multi-thread processor of claim 11 where at least one of the fetch stage, the decode stage, the first execution stage, the second execution stage, the load store stage, and the writeback stage receive data from a previous stage through a pipeline register.

15. The multi-thread processor of claim 11 where the second execution stage performs a single logical or arithmetic operation in a thread mode and performs two simultaneous independent logical or arithmetic operations in a micro-thread mode.

16. The multi-thread processor of claim 11 where at least one instruction stored in the instruction memory is a thread enable instruction which causes the first execution stage or the second execution stage to operate on subsequently received instructions from a thread mode instruction set comprising single arithmetic or logic instructions present on a data width.

17. The multi-thread processor of claim 11 where the first execution stage or the second execution stage has a reconfigurable adder comprising two adders, each adder having a carry input and a carry output, the reconfigurable adder operative in a thread mode where a first adder carry output is coupled to a second adder carry input, the reconfigurable adder operative in a micro-thread mode where the first adder carry output is coupled to a first micro-thread status register carry out bit and the second adder carry input is coupled to a second micro-thread status register carry in bit.

18. The multi-thread processor of claim 17 where in micro-thread mode, the first adder carry input is coupled to a carry in bit of the first micro-thread status register, and the second adder carry output is coupled to a carry out bit of the second micro-thread status register.

* * * * *